US008126155B2

(12) United States Patent
Liu et al.

(10) Patent No.: US 8,126,155 B2
(45) Date of Patent: Feb. 28, 2012

(54) REMOTE AUDIO DEVICE MANAGEMENT SYSTEM

(75) Inventors: Qiong Liu, Miliptas, CA (US); Donald G. Kimber, Montara, CA (US); Jonathan T. Foote, Menlo Park, CA (US); Chunyuan Liao, Adelphi, MD (US); John E. Adcock, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1241 days.

(21) Appl. No.: 10/612,429

(22) Filed: Jul. 2, 2003

(65) Prior Publication Data

US 2005/0002535 A1 Jan. 6, 2005

(51) Int. Cl.
*H04R 29/00* (2006.01)
*H04N 7/18* (2006.01)
*H04N 5/232* (2006.01)

(52) U.S. Cl. .......... 381/58; 348/143; 348/152; 348/155; 348/159; 348/211

(58) Field of Classification Search ............... 348/231.4, 348/15, 218, 143, 152, 155, 159, 211, 153; 381/74.1, 94.1, 58; 725/37, 59
See application file for complete search history.

(56) References Cited

U.S. PATENT DOCUMENTS

| | | | | |
|---|---|---|---|---|
| 5,757,424 | A | 5/1998 | Frederick | 348/218 |
| 6,452,628 | B2 | 9/2002 | Kato et al. | 348/211 |
| 6,624,846 | B1 | 9/2003 | Lassiter | 348/211.4 |
| 6,654,498 | B2 * | 11/2003 | Takahashi et al. | 382/232 |
| 6,774,939 | B1 * | 8/2004 | Peng | 348/231.4 |
| 6,839,067 | B2 | 1/2005 | Liu et al. | 345/647 |
| 7,015,954 | B1 * | 3/2006 | Foote et al. | 348/218.1 |
| 7,237,254 | B1 * | 6/2007 | Omoigui | 725/94 |
| 7,349,005 | B2 * | 3/2008 | Rui et al. | 348/14.11 |

(Continued)

FOREIGN PATENT DOCUMENTS

JP 9275533 10/1997

OTHER PUBLICATIONS

Harry F. Silverman, William R. Paterson III, James L. Flanagan, Daniel Rabinkin; *A Digital Processing System for Source Location and Sound Capture by Large Microphone Arrays*, 4 pgs., In Proceedings of ICASSP 97, Munich, Germany, Apr. 1997.

(Continued)

*Primary Examiner* — Devona Faulk
*Assistant Examiner* — George Monikang
(74) *Attorney, Agent, or Firm* — Fliesler Meyer LLP

(57) ABSTRACT

An audio device management system (ADMS) manages remote audio devices via user selections in video links. The system enhances audio acquisition quality by receiving and processing human suggestions, forming customized two-way audio links according to user requests, and learning audio pickup strategies and camera management strategies from user operations. The ADMS control interface for a remote user provides a multi-window GUI that provides an overview window and selection display window. The ADMS provides users with more flexibility to enhance audio signals according to their needs and makes it more convenient to form customized two-way audio links without requiring users to remember a list of phone numbers. The ADMS also automatically manages available microphones for audio pickup based on microphone sound quality and the system's past experience when users monitor a structured audio environment without explicitly expressing their attentions in the video window.

15 Claims, 14 Drawing Sheets

U.S. PATENT DOCUMENTS

| | | | | |
|---|---|---|---|---|
| 7,428,000 | B2 * | 9/2008 | Cutler et al. | 348/14.11 |
| 2002/0109680 | A1 * | 8/2002 | Orbanes et al. | 345/418 |
| 2003/0081120 | A1 * | 5/2003 | Klindworth | 348/143 |

OTHER PUBLICATIONS

Daniel V. Rabinkin, *Digital Hardware and Control for a Beam-Forming Microphone Array*, M.S. Thesis, Electrical and Computer Engineering, Rutgers University, pp. 1-70, New Brunswick, New Jersey, Jan. 1994.

Bill Kapralos, Michael R. M. Jenkin, Evangelos Milios, *Audio-Visual Localization of Multiple Speakers in a Video Teleconferencing Setting*, Technical Report CS-2002-02, pp. 1-70, Department of Computer Science, York University, Ontario, Canada, Jul. 15, 2002.

Bell, Anthony J., et al. "An Information-Maximization Approach to Blind Separation and Blind Deconvolution," Neural Computation, 7, Massachusetts Institute of Technology, pp. 1129-1159, 1995.

Translation of JP-09-275533 Publication, 4 pages.

Bibliographic data of JP-09-275533 (Abstract), 1 page.

Office Action in connection with Japanese Patent Application No. 2004-193787 dated Apr. 24, 2009, 3 pages.

Translation of Office Action in connection with Japanese Patent Application No. 2004-193787 dated Apr. 24, 2009, 2 pages.

* cited by examiner

FIG. 1 - Prior Art

FIG. 2 - Prior Art

REMOTE AUDIO DEVICE MANAGEMENT SYSTEM

CROSS REFERENCE TO RELATED APPLICATIONS

The present application is related to the following United States patents and patent applications, which patents/applications are assigned to the owner of the present invention, and which patents/applications are incorporated by reference herein in their entirety:

U.S. patent application Ser. No. 10/205,739, entitled "Capturing and Producing Shared Resolution Video," filed on Jul. 26, 2002, currently pending.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to audio and video signal processing, and more particularly to acquiring audio signals and providing high quality customized audio signals to a plurality of remote users.

BACKGROUND OF THE INVENTION

Remote audio and video communication over a network is increasingly popular for many applications. Through remote audio and video access, students can attend classes from their dormitories, scientists can participate in seminars held in other countries, executives can discuss critical issues without leaving their offices, and web surfers can view interesting events through webcams. As this technology develops, part of the challenge is to provide customized audio to a plurality of users.

Many audio enhancement techniques, such as beam forming and ICA (Independent Component Analysis) based blind source separation, have been developed in the past. To use these techniques in a real environment, it is critical to know spatial parameters of users' attention. For example, if the system points a high performance beam former in an incorrect direction, the desired audio may be greatly attenuated due to the high performance of the beam former. The ICA approach has similar results. If an ICA system is not configured with information related to what a user wants to hear, the system may provide a reconstructed source signal that shields out the user's desired audio.

One common form of remote 2-way audio communication is the telephone. Telephone systems give us the opportunity to form a customized audio link with phones. To form telephone links with various collaborators, users are forced to remember large quantities of phone numbers. Although modern advanced telephones try to assist users by saving these phone numbers and corresponding collaborators' names in phone memory, going through a long list of names is still a cumbersome task. Moreover, even if a user has the number of a desired collaborator, the user does not know if the collaborator is available for a phone conversation.

Many audio pick-up systems of the prior art use far-field microphones. Far-field microphones pick up audio signals from anywhere in an environment. As audio signals come from all directions, it may pick up noise or audio signals that a user does not want to hear. Due to this property, a far-field microphone generally has worse signal-to-noise ratio than close-talking microphones. Although a far-field microphone has the drawback of a poor signal-to-noise ratio, it is still widely used for teleconference purposes because remote users may conveniently monitor the audio of an entire environment.

To overcome some of the drawbacks of far-field microphones, such as the pick-up or capture of audio signals from several sources at the same time, some researchers proposed to use the ICA approach to separate sound signals blindly for sound quality improvement. The ICA approach showed some improvement in many constraint experiments. However, this approach also raised new problems when used with far-field microphones. ICA requires more microphones than sound sources to solve the blind source separation problem. As the number of microphones increases, the computational cost becomes prohibitive for real time applications. The ICA approach also requires its user to select proper nonlinear mappings. If these nonlinear mappings cannot match input probability density functions, the result will not be reliable.

Removing independent noises acquired by different microphones is another problem for the ICA approach. As an inverse problem, if the underlying audio mixing matrix is singular, the inverse matrix for ICA will not be stable. Besides all these problems, classical ICA approach eliminates location information of sound sources. Since the location information is eliminated, it becomes difficult for some final users to select ICA results based on location information. For example, an ideal ICA machine may separate signals from ten audio sources and provide ten channels to a user. In this case, the user must check all ten channels to select the source that the user wants to hear. This is very inconvenient for real time applications.

Besides the ICA approach, some other researchers use the beam-forming technique to enhance audio in a specific direction. Compared with the ICA approach, the beam-forming approach is more reliable and depends on sound source direction information. These properties make beam-forming better suited for teleconference applications. Although the beam-forming technique can be used for pick-up of audio signals from a specific direction, it still does not overcome many drawbacks of far-field microphones. The far-field microphone array used by a beam-forming system may still capture noises along a chosen direction. The audio "beam" formed by a microphone array is normally not very narrow. An audio "beam" wider than necessary may further increase the noise level of the audio signal. Additionally, if a beam former is not directed properly, it may attenuate the signal the user wants to hear.

FIG. 1 illustrates a typical control structure 100 of an automatic beam former control system of the prior art. Here, the control unit 140 (performed by a computer or processor) acquires environmental information 110 with sensors 120, such as microphones and video cameras. The microphones used for the control may be the microphones used for beam-forming. A single sensor representation is illustrated to represent both audio and visual sensors to make the control structure clear. Based on the audio and visual sensory information, the control unit 140 may localize the region of interest, and point the beam former 130 to the interesting spot. In this system, the sensors and the controlled beam former must be aligned well to achieve quality audio output. This system also requires a control algorithm to accurately predict the region in which audience members are interested. Computer prediction of the region of interest is a considerable problem.

FIG. 2 shows the control structure 200 of a traditional human operated audio management system. Here, the human operator 230 continuously monitors environment changes via audio and video sensors 220, and adjusts the magnification of various microphones based on environment changes. Compared to state-of-the-art automatic microphone management, a human controlled audio system is often better at selecting meaningful high quality audio signals. However, human controlled audio systems require people to continuously monitor and control audio mixers and other equipment.

What is needed is a audio device management system that enhances audio acquisition quality by using human suggestions and learning audio pick-up strategies and camera management strategies from user operations and input.

SUMMARY OF THE INVENTION

An audio device management system (ADMS) manages remote audio devices via user selections in video links. The system enhances audio acquisition quality by receiving and processing human suggestions, forming customized two-way audio links according to user requests, and learning audio pickup strategies and camera management strategies from user operations.

The ADMS is constructed with microphones, speakers, and video cameras. The ADMS control interface for a remote user provides a multi-window GUI that provides an overview window and selection display window. With the ADMS, GUI remote users can indicate their visual attentions by selecting regions of interest in the overview window.

The ADMS provides users with more flexibility to enhance audio signals according to their needs and makes it more convenient to form customized two-way audio links without requiring users to remember a list of phone numbers. The ADMS also automatically manages available microphones for audio pickup based on microphone sound quality and the system's past experience when users monitor a structured audio environment without explicitly expressing their attentions in the video window. In these respects, the ADMS differs from fully automatic audio pickup systems, existing telephone systems, and operator controlled audio systems.

DETAILED DESCRIPTION

Figure 1:
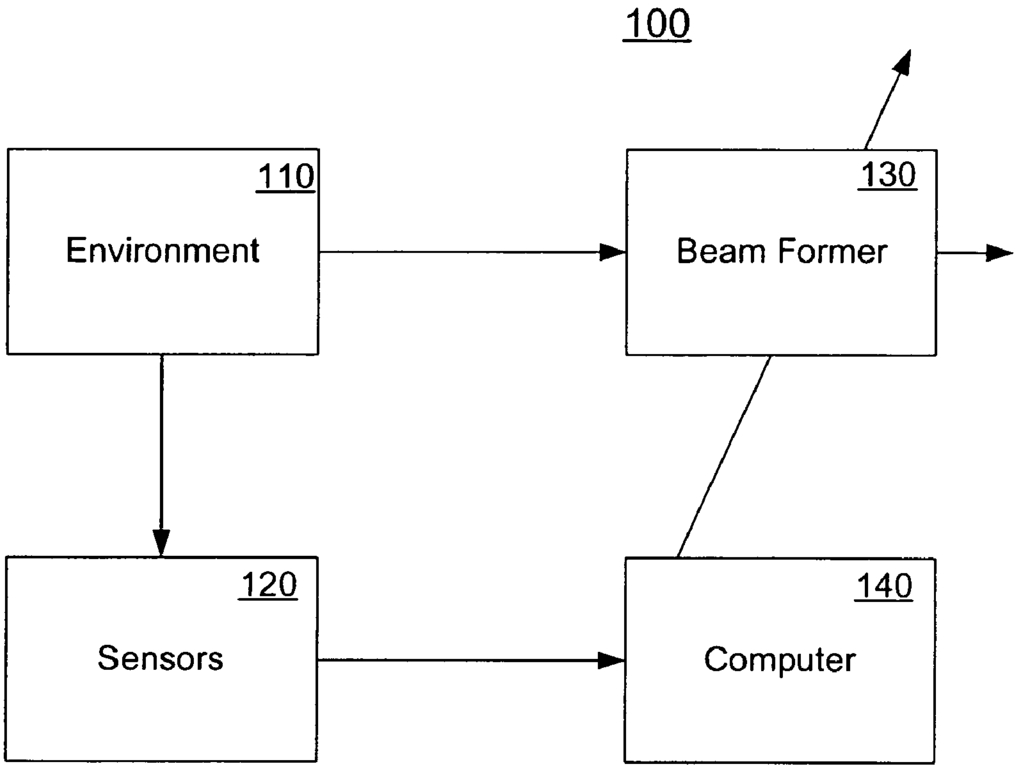
FIG. 1 is an illustration of an automatic beam former control system of the prior art.
Figure 2:
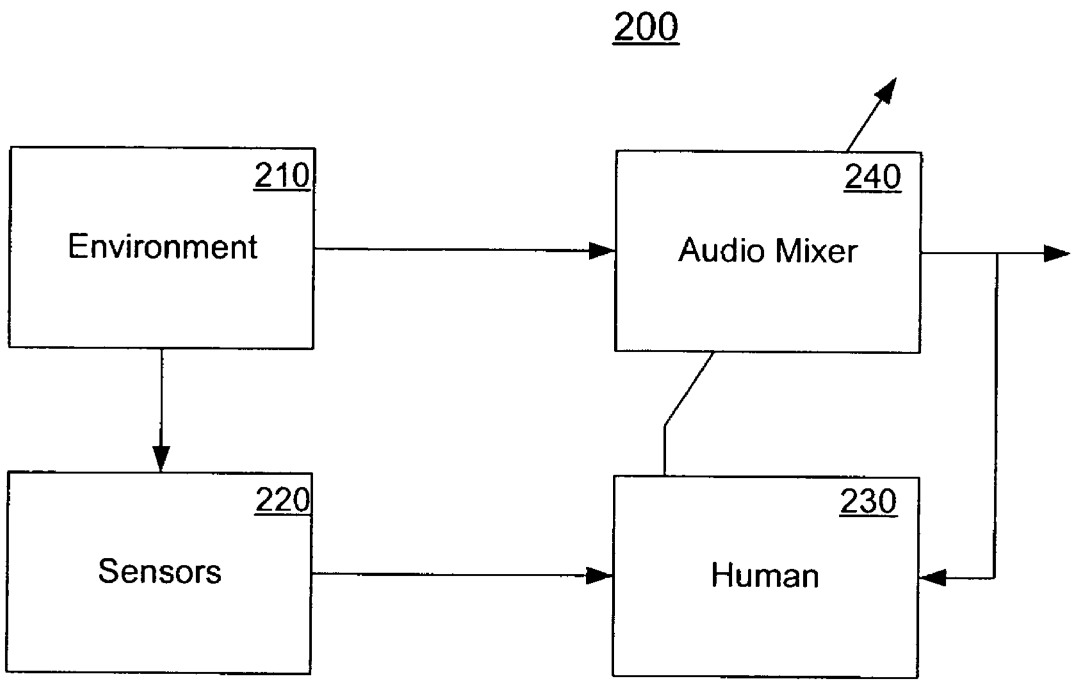
FIG. 2 is an illustration of a human-operator controlled audio management system of the prior art.

Audio pickup devices used can be categorized as far-field microphones or close-talking (near-field) microphones. The audio device management system (ADMS) of one embodiment of the present invention uses both types of microphones for audio signal acquisition. Far-field microphones pick-up or capture audio signals from nearly any location in an environment. As audio signals come from multiple directions, they may also pick-up noise or audio signals that a user does not want to hear. Due to this property, a far-field microphone generally has worse signal-to-noise ratio than close-talking microphones. Although far-field microphones have this drawback of poor signal-to-noise ratio, it is still widely used for teleconferencing because it is convenient for remote users to monitor the whole environment.

To compensate for drawbacks inherent in far-field microphones, it is better to use close-talking microphones in the conference audio system. Close-talking microphones typically capture audio signals from nearby locations. Audio signals originating relatively far from this type of microphone are greatly attenuated due to the microphone design. Therefore, close-talking microphones normally achieve much higher signal-to-noise ratio than far-field microphones and are used to capture and provide high quality audio. Besides high signal-to-noise ratio, close-talking microphones can also help the system to separate a high-dimensional ICA problem into multiple low-dimensional problems, and associate location information with these low-dimensional problems. If close-talking microphones are used properly, they may also help the audio system capture less noise along a user selected direction.

Although close-talking microphones have many advantages over far-field microphones, close-talking microphones shouldn't be used to replace all far-field microphones in some circumstances for several reasons. Firstly, in a natural environment, people may sit or stand at various locations. A small number of close-talking microphones may be not enough to acquire audio signals from all these locations. Secondly, intensively packing close-talking microphones everywhere is expensive. Finally, connecting too many microphones in an audio system may make the system too complicated. Due to these concerns, both close-talking microphone and far-field microphone are used in the ADMS construction. Similarly, various audio playback devices, such as headphones and speakers, are used in the ADMS construction.

After various devices are installed, the audio management system of the present invention may selectively amplify sound signals from various microphones according to selections relating to remote users' attentions. The physical location of a microphone is a convenient parameter for distinguishing one microphone from another. To use this control parameter, users can input the coordinates of a microphone, mark the microphone position within a geometric model, or provide some other type of input that can be used to select a microphone location. Since these approaches do not provide enough context of the audio environment, they are not a friendly interface for remote users. In one embodiment of the present invention, video windows are used as the user interface for managing the distributed microphone array. In this manner, remote users can view the visual context of an event (e.g. the location of a speaker) and manage distributed microphones according to the visual context. For example, if a user finds and selects the presenter in the visual context in the form of video, the system may activate microphones near the presenter to hear high quality audio. In one embodiment, to support this microphone array management approach, the ADMS uses hybrid cameras having a panoramic camera and a high resolution camera in the audio management system. In one embodiment, the hybrid camera may be a FlySPEC type cameras as disclosed in U.S. patent application Ser. No. 10/205,739, which is incorporated by reference in its entirety. These cameras are installed in the same environment as microphones to ensure video signals are closely related to audio signals and microphone positions.

Figure 3:
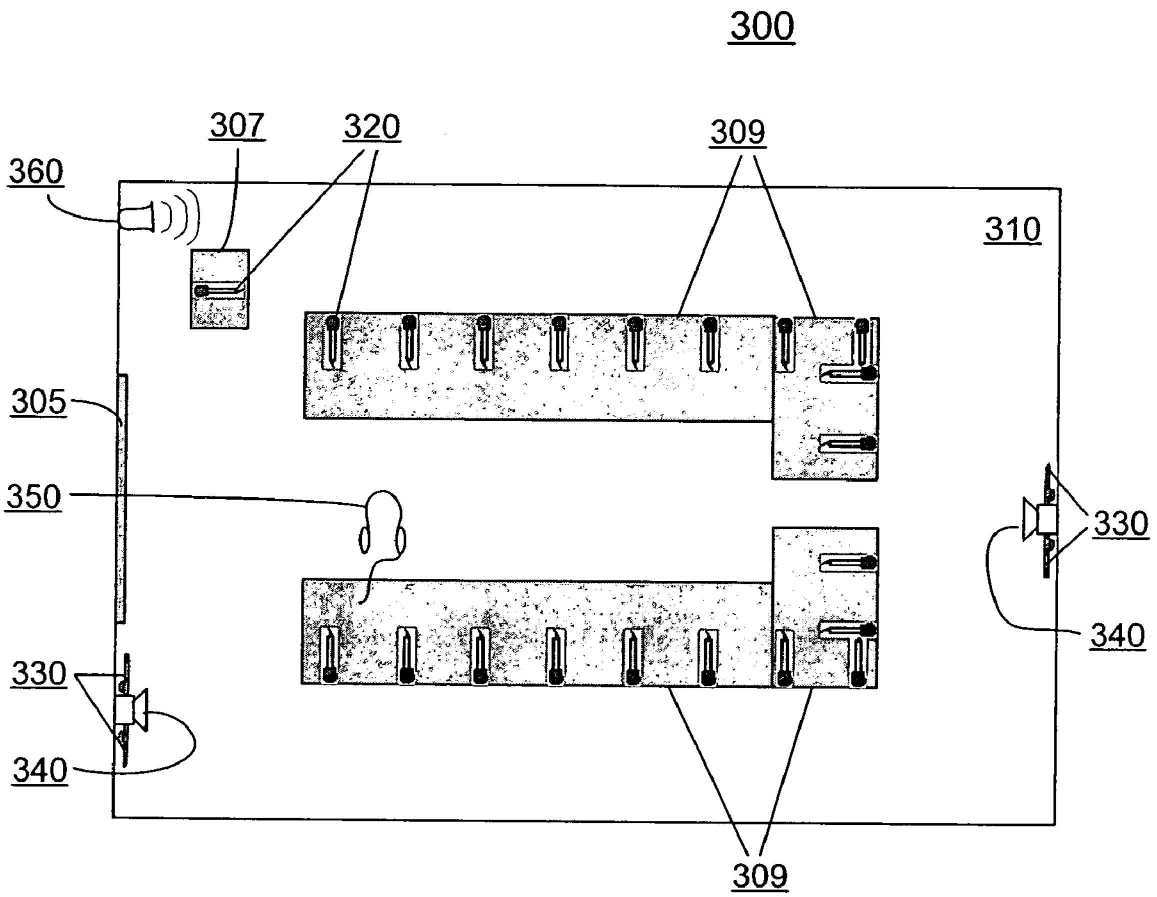
FIG. 3 is an illustration of an environment having audio and video sensors in accordance with one embodiment of the present invention.

To illustrate the use of these ideas in a real environment, an audio management system may be discussed in the context of a conference room example. FIG. 3 illustrates a top view of a conference room 310 having sensor devices for use with an ADMS in accordance with one embodiment of the present invention. Conference room 310 includes front screen 305, podium 307, and tables 309. In the embodiment shown, close-talking microphones 320 are dispersed throughout the room on tables 309 and podium 307. In one embodiment, the close talking microphones may be GN Netcom Voice Array Microphones that work within 36 inches, or other close-field microphone combinations. In the audio system shown, many close-field microphones are located on tables 309 to capture voices and other audio near the tables 309. Far-field microphone arrays 330 can capture sound from the entire room. Camera systems 340 are placed such that remote users can watch events happening in the conference room. In one embodiment, the cameras 340 are FlySpec cameras. Headphones 350 may be placed at any location, or locations, in the room for a private discussion as discussed in more detail below. Loud speaker 360 may provide for one or more remote users to speak with those in the conference room. In another embodiment, the loud speakers allow any person, persons, or automated system to provide audio to people and audio processing equipment located in the conference room. If necessary, extending the ADMS to allow text exchange via PDA or other devices is also possible.

Figure 4:
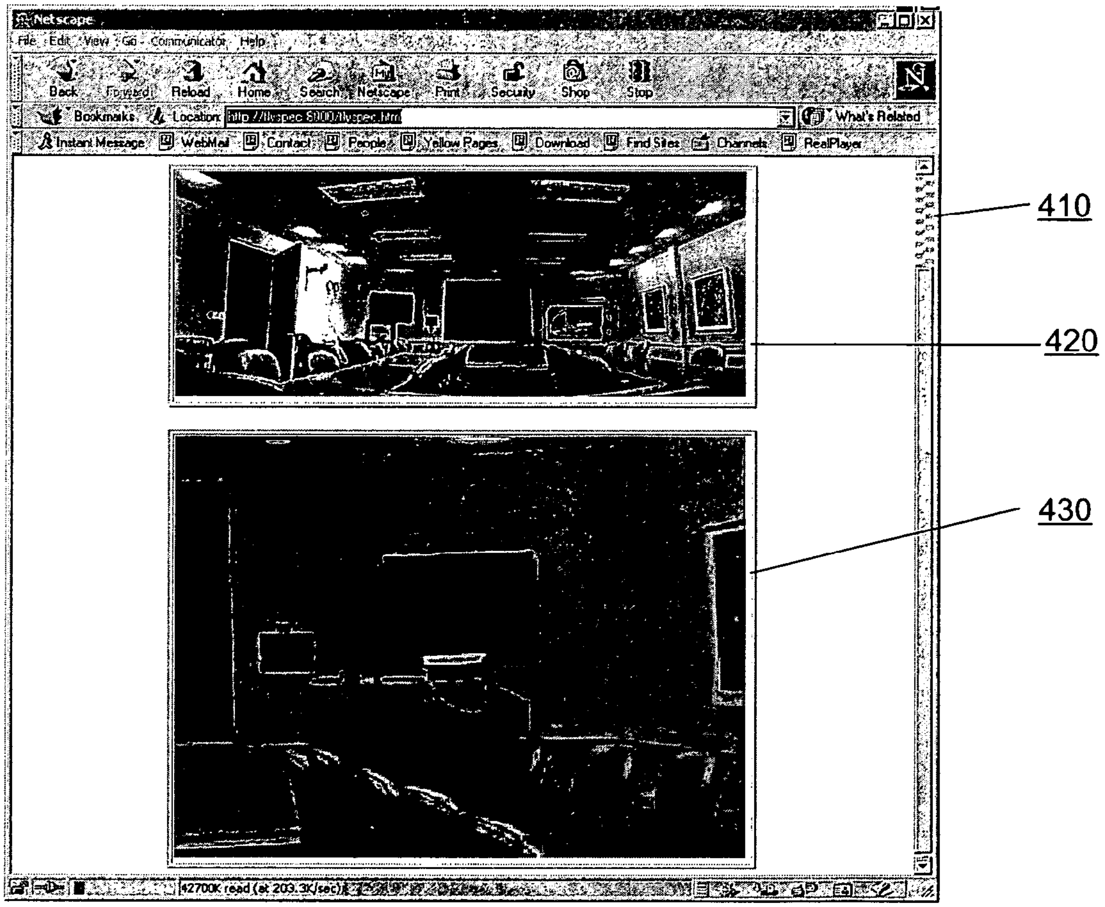
FIG. 4 is an illustration of a graphical user interface for providing audio and video to a user in accordance with one embodiment of the present invention.

In one embodiment, the ADMS of the present invention may be used with a GUI or some other type of interface tool. FIG. 4 illustrates an ADMS GUI 400 in accordance with one embodiment of the present invention. The ADMS GUI 400 consists of a web browser window 410. The web browser window 410 includes an overview window 420 and a selection display window 430. The overview window may provide an image or video feed of an environment being monitored by a user. The selection display window provides a close-up image or video feed of an area of the overview window. In one embodiment wherein the video sensors include a hybrid camera such as the FlySpec camera, overview window 420 displays video content captured by the hybrid camera panoramic camera and selection display window 430 displays video content captured by the hybrid camera high resolution camera.

Using this GUI, the human operator may adjust the selection display video by providing input to select an interesting region in the overview window. Thus, a region in the overview window selected by a user generated gesture input is displayed in higher resolution in the selection display window. In one embodiment, the input may be gesture. A gesture may be received by the system of the present invention through an input device or devices such as a mouse, touch screen monitor, infra-red sensor, keyboard, or some other input device. After the interesting region is selected in some way, the region selected will be shown in the selection display window. At the same time, audio devices close to the selected region will be activated for communication. In one embodiment, the region selected by a user will be visually highlighted in the overview window in some manner, such as with a line or a circle around the selected area. For pure audio management, the selected region in the overview window is enough for the ADMS. The selection result window in the interface is to motivate the user to select her/his interested region in the upper window, and let the audio management system in the environment take control of they hybrid camera. A selection result window also helps the audio management by letting users watch more details.

In one embodiment, two modes can be configured for the interface. In the first mode, a participant or user receives one-way audio from a central location having sensors. In the embodiment illustrated in FIG. 3, the central location would be the conference room having the microphones and video cameras. When the participant selects this mode, his or her selection in the video window will be used for audio pickup. In the second mode, a remote participant or user may participate in two way audio communication with a second participant. In one embodiment, the audio communication may be with a second participant located at the central location. The second participant may be any participant at the central location. When a remote participant selects this mode, his/her selection in the video window will be used for activating both the pickup and the playback devices (e.g. a cell phone) near the selected direction.

Figure 5:
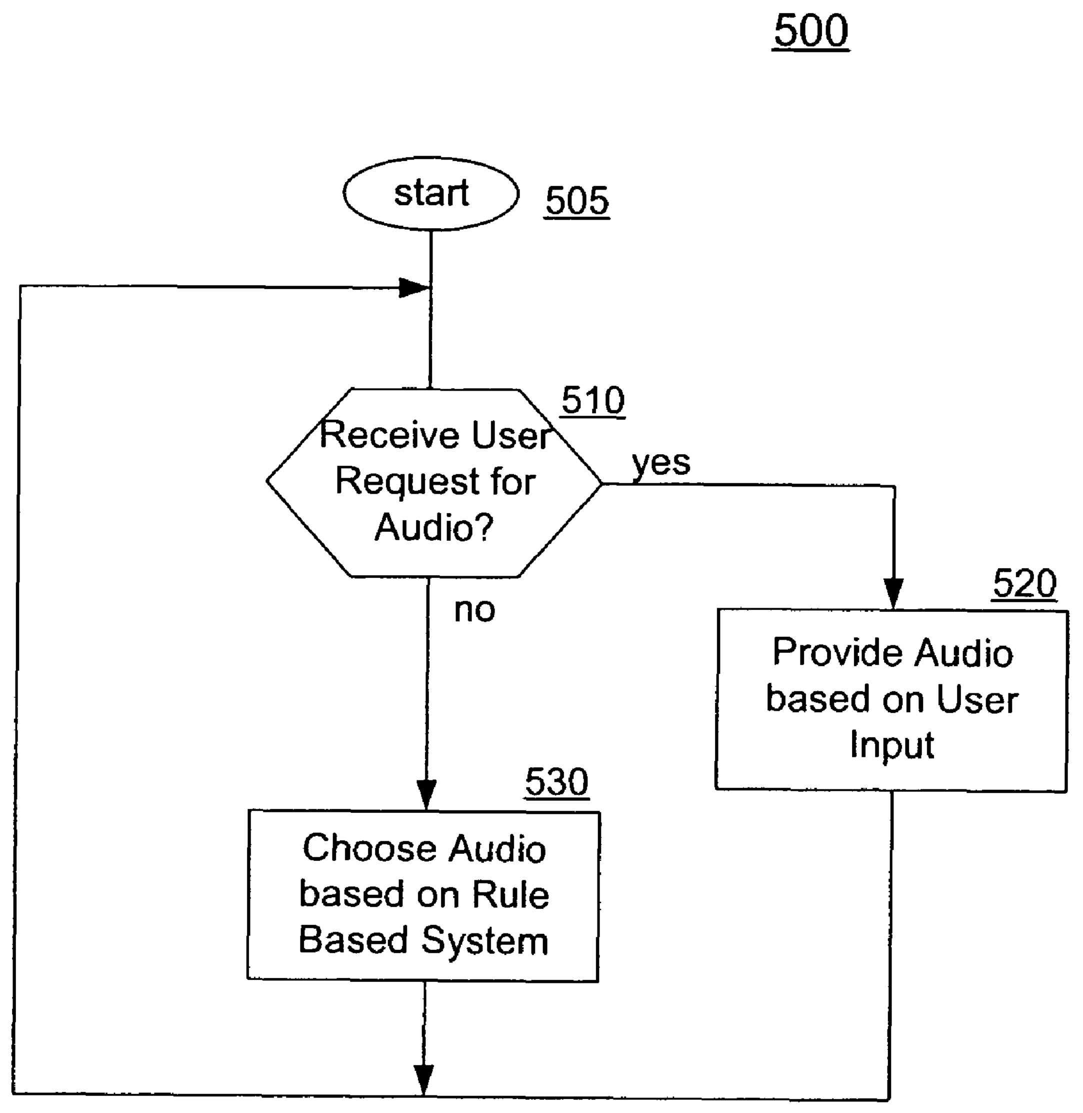
FIG. 5 is an illustration of a method for determining audio device selection in accordance with one embodiment of the present invention.

In one embodiment, multiple users can share cameras and audio devices in the same environment. The multiple users can view the same overview window content and select their own content to be displayed in the selection result window. FIG. 5 illustrates a method 500 for implementing an ADMS control system in accordance with one embodiment of the present invention. Method 500 begins with start step 505. Next, the system determines if a user request for audio has been received in step 510. In one embodiment, the user request may be received by a user selection of a region of the overview window in ADMS GUI 400. The selection maybe input by entering window coordinates, selecting a region with a mouse, or some other means. If a user request has been received, audio is provided to the requesting user based on the user's request at step 520. Step 520 is discussed in more detail below with respect to FIG. 6. If no user request is determined to be received at step 510, then operation continues to step 530. At step 530, audio is provided to users via a rule-based system. The rule-based system is discussed in more detail below.

Figure 6:
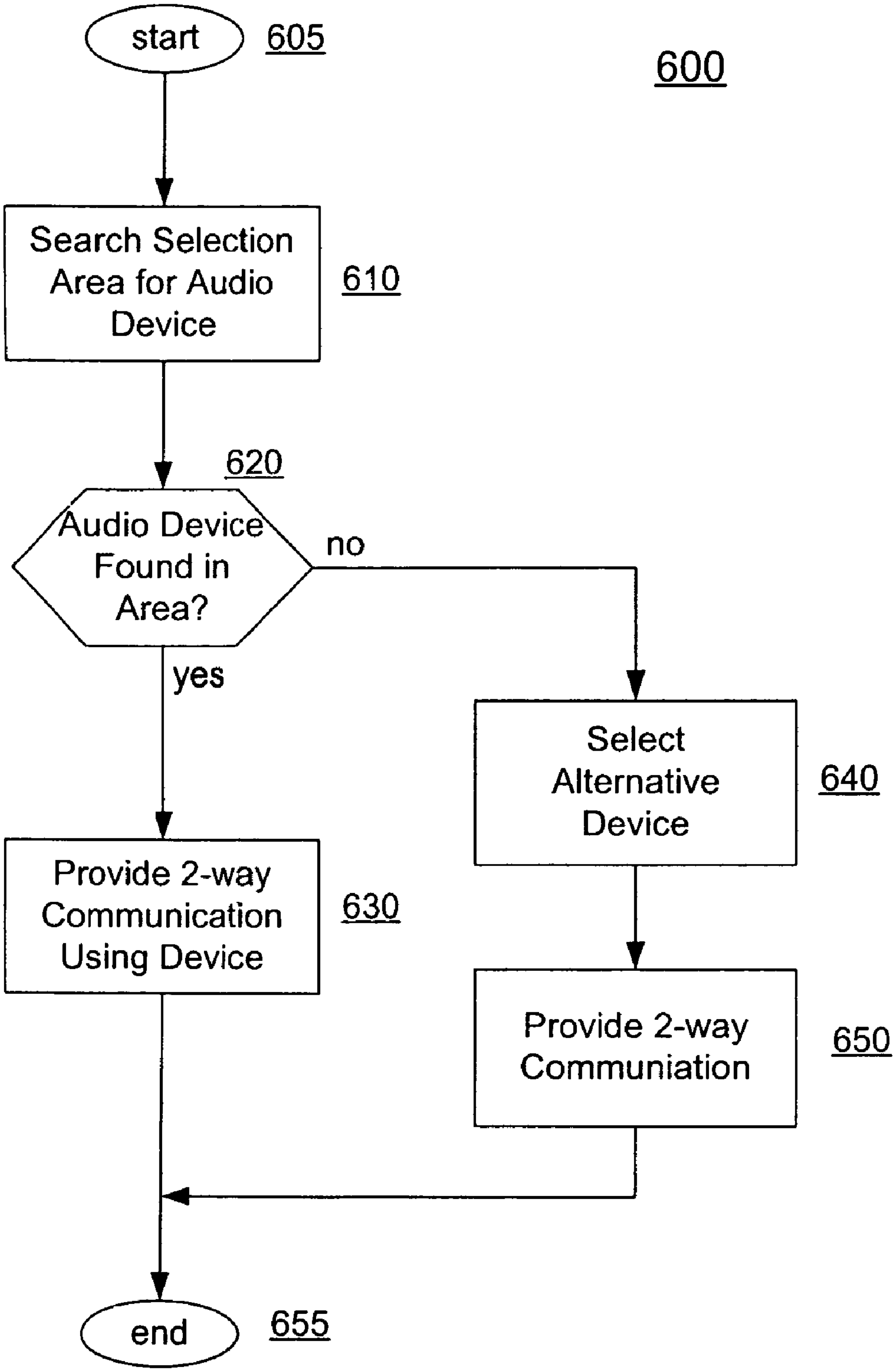
FIG. 6 is an illustration of a method for providing audio based on user input in accordance with one embodiment of the present invention.

FIG. 6 illustrates a method 600 for providing audio to a user based on a request received from the user. Method 600 begins with start step 605. Next, an area associated with a user's selection is searched for corresponding audio devices at step 610. In one embodiment, the selection area is determined when a user selects a portion of a GUI window. The window may display a representation of some environment. The environment representation may be a video feed of some location, a still image of a location, a slide show of a series of updated images, or some abstract representation of an environment. In the GUI illustrated in FIG. 4, a user selects a portion of the overview window. In any case, different portions of the environment representation can be associated with different audio devices. The audio devices may be listed in a table or database format in a manner that associates them with specific coordinates in the GUI window. For example, in an environment representation of a conference room, wherein the window displays a speaker at a podium in the center region of the window, pixels associated with the center region of the window may be associated with output signal information regarding the microphone located at the podium. Once a selection area is received, the ADMS may search a table, database, or other source of information regarding audio devices associated with the selected area. In one embodiment, an audio device may be associated with a selected area if the audio device is configured to point, be directed to, or otherwise receive audio that originates or is otherwise associated with the selected area.

Next, the system determines if any audio devices were associated with the selected area at step 620. If audio devices are associated with the selected area, then two way communication is provided at step 630 and method 600 ends at step 660. Providing two-way communication at step 630 is discussed below with respect to FIG. 7. If no audio device is found to be associated with the specific area, then operation continues to step 640 where an alternate device is selected. The alternate device may be a device that is not specifically targeted towards the selected area but provides two way communication with the area, such as a nearby telephone. Alternatively, the alternate communication device could be a loud speaker or other device that broadcasts to the entire environment. Once the alternate audio device is selected, the alternate audio device is configured for user communication at step 650. Configuring the device for user communication includes configuring the capabilities of the device such that the user may engage in two-way audio communication with a second participant at the central location. After step 650, operation ends at step 655.

Figure 7:
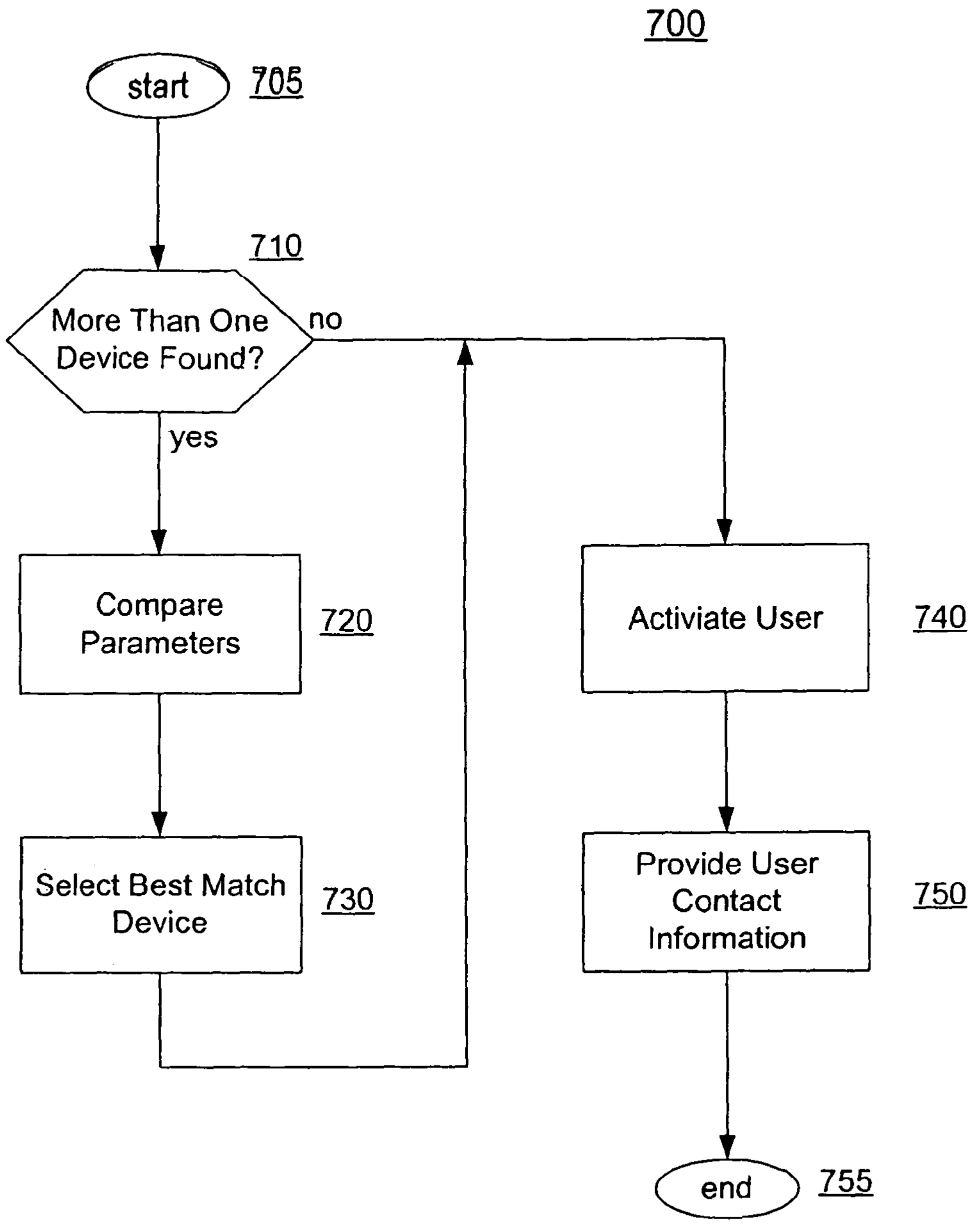
FIG. 7 is an illustration of a method for selecting an audio source in accordance with one embodiment of the present invention.

FIG. 7 illustrates a method 700 for selecting an audio device associated with a user selection in accordance with one embodiment of the present invention. Method 700 begins with start step 705. Next, the ADMS determines if more than one audio device is associated with the user selected region at step 710. If only one device is associated with the user selected region, then operation continues to step 740. If multiple devices are associated with the selected region, then operation continues to step 720. At step 720, parameters are compared to determine which of the multiple devices would be the best device. In one embodiment, parameters regarding preset security level, sound quality, and device demand may be considered. When multiple parameters are compared, each parameter may be weighted to give an overall rating for each device. In another embodiment, parameters may be compared in a specific order. In this case, subsequent compared parameters may only be compared if no difference or advantage was associated with a previously compared parameter. Once parameters associated with the audio devices are compared, the best match audio device is selected at step 730 and operation continues to step 740.

The device is activated at step 740. In one embodiment, activating a device involves providing the audio capabilities of the device to the user selecting the device. User contact information may then be provided at step 750. In one embodiment, the user contact information is provided to the audio device itself in a form that allows a connection to be made with the audio device. In another embodiment, providing contact information includes providing identification and contact information to the audio device, such that a second participant near the audio device may engage in audio communication with the first remote participant who selected the area corresponding the particular audio device. Once contact information is provided, operation of method 700 ends at step 755.

Figure 8:
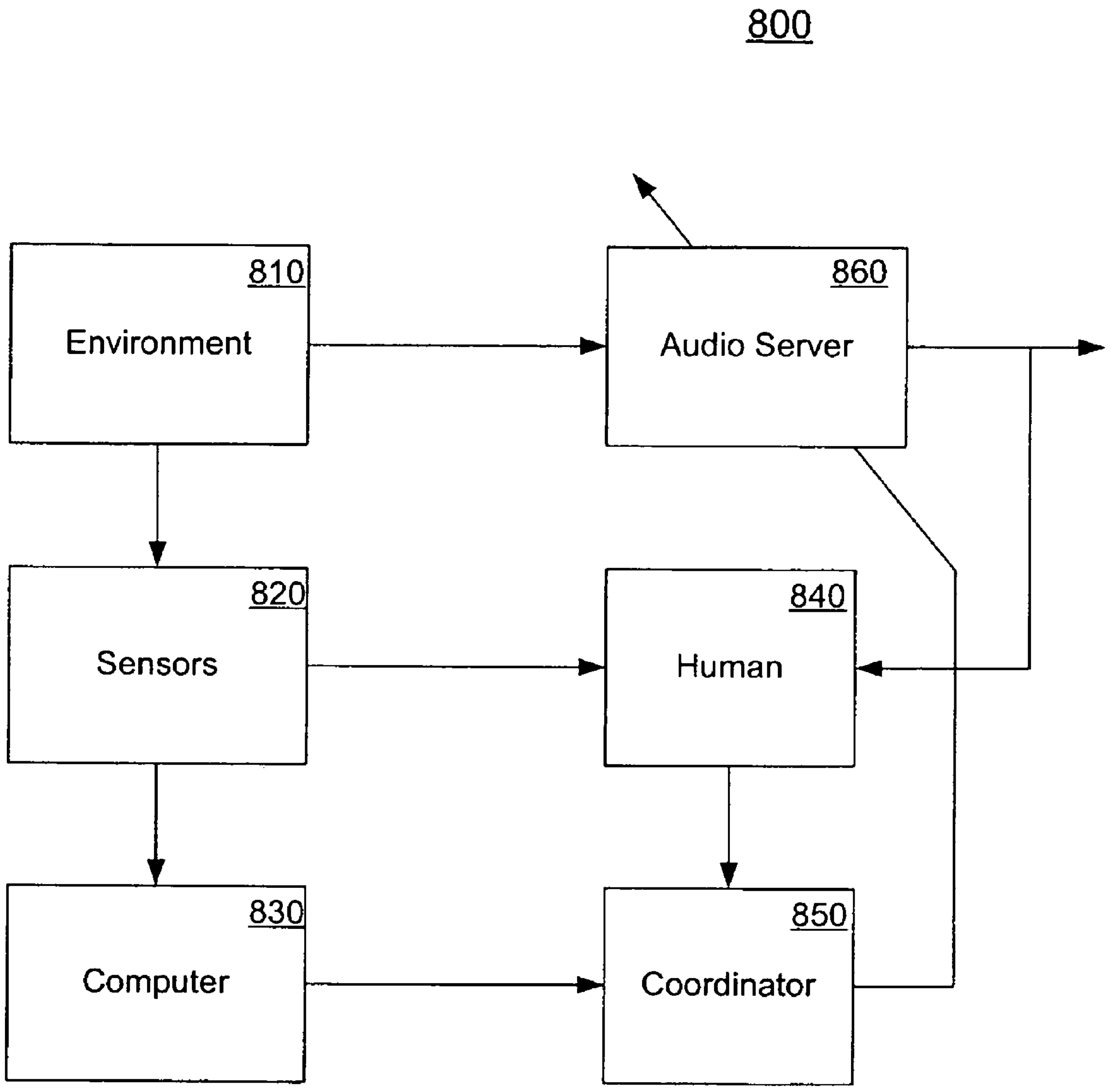
FIG. 8 is an illustration of a single-user controlled audio device management system in accordance with one embodiment of the present invention.

FIG. 8 illustrates a single-user controlled ADMS 800 in accordance with one embodiment of the present invention. ADMS 800 includes environment 810, sensors 820, computer 830, human 840, coordinator 850, and audio server 860.

In this system, both the human operator (i.e., the system user) and the automatic control unit can access data from sensors. In one embodiment of the present invention, the sensors may include panoramic cameras, microphones, and other video and audio sensing devices. With this system, the user and the automatic control unit can make separate decisions based on environmental information. In one embodiment, the decisions by the user and automatic control unit may be different. To resolve conflicts, the human decision and the control unit decision are sent to a coordinator unit before the decision is sent to the audio server. In a preferred embodiment, the human choice is considered more desirable and meaningful than the automatic selection. In this case, a human decision in conflict with an automatic unit decision overrides the automatic unit decision inside the coordinator. In another embodiment, each of the user and automatically selected regions are associated with a weight. Factors in determining the weight of each selection may include signal-to-noise ratio in the audio associated with each selection, reliability of the selection, the distortion of the video content associated with each selection, and other factors. In this embodiment, the coordinator will select the selection associated with the highest weight and provide the audio corresponding to the weighted selection to the user. In an embodiment where no user selection is made within a certain time period, the weight of the user selection is reduced such that the automatic selection is given a higher weight.

In ADMS 800, the user monitors the microphone array management process instead of operating the audio server continuously. To ensure audio selection quality, the human operator only needs to adjust the system when the automatic system misses the direction of interest. Thus, the system is fully automatic when no human operator provides controlling input. For an automatic system, which may miss the correct direction for audio enhancement, a human operator can drastically decrease the miss rate. Compared with a manual microphone array management system, this system can substantially reduce the human operator effort required. ADMS 800 allows users to make the tradeoff between operator effort and audio quality.

With the control structure setup illustrated in FIG. 8, audio management is performed by maximizing the audio quality in user-selected directions. As multiple users access the ADMS simultaneously, the ADMS generates multiple optimal audio signal streams for various users according to their respective requests. In one embodiment, the ADMS of the present invention measures audio quality with signal-to-noise ratio. Assume i is the index of microphones, $s_i$ is the pure signal picked by microphone i, $n_i$ is the noise picked by microphone i, $(x_i, y_i)$ is the coordinates of microphone i's image in the video window, and $R_u$ is the region related to a user u's selection in the video window. A simple microphone selection strategy for user u can be defined with $$i_u = \underset{(x_i,y_i)\in R_u}{\arg\max}\left(\frac{s_i}{n_i}\right) \tag{1}$$

Thus, equation (1) selects the microphone or other audio signal capturing device which has the best signal-to-noise ratio (SNR) in the user-selected region or direction. Thus, the microphone may be located in the area corresponding to the region selected by the user or be directed to capture audio signals present in the region selected by the user. In this equation, the definition of $R_u$ may be defined in a static or dynamic way. The simplest definition of $R_u$ is the user-selected region. For a fixed close-talking microphone, such as microphone 320 shown in FIG. 3, the coordinates of the microphone in the window are fixed. For a far-field microphone array near to a video camera, such as microphone 330 shown in FIG. 3, its coordinates may be anywhere in the corresponding video window supported by camera 340 in FIG. 3. A far-field microphone that is not near a camera is considered to be a microphone that can be moved anywhere. Therefore, the optimization in eq. (1) takes both far-field microphones and near-field microphones into account. In another embodiment, a more sophisticated definition of $R_u$ may be the smallest region that includes k microphones around the selected region center. When a user does not make any selection, the system can pick the microphone for this user according to $$i_u = \underset{(x_i,y_i)\in\{R_{u1},R_{u2},\ldots,R_{uM}\}}{\arg\max}\left(\frac{s_i}{n_i}\right) \tag{2}$$

This is the best channel within all users' selections $\{R_{u1}, R_{u2}, \ldots, R_{uM}\}$. When no user gives any suggestion to the microphone management system, the selection can be over all microphones. This selection can be described with $$i_u = \arg\max\left(\frac{s_i}{n_i}\right) \tag{3}$$

The audio system of the present invention may use other audio device selection techniques, such as ICA and beam forming. For example, K number of microphones can be used near the selected region to perform ICA. The K signals can also be shifted according to their phases, and can be added together to reduce unwanted noises. All outputs generated by ICA and beam forming may be compared with the original K signals. Regardless of the method used, the determination for final output may still be based on SNR.

From eq. (1)-(3), it is assumed that signal and noise are known for each microphone. In an embodiment wherein signal and noise are not known for a microphone, a threshold for the microphone can be set. In one embodiment, the threshold may be set according to experiment, wherein acquired data is considered noise if the data is below the threshold. In this way, the system may estimate the noise spectrum $n_i(f)$ when no event is going on or minimal audio signals are being captured by microphones and other devices. When the microphone acquires data $a_i(f)$ that is higher than the threshold, the signal spectrum $s_i(f)$ may be estimated with $$s_i(f) = \begin{cases} 0 & \text{if } [a_i(f) - n_i(f)] < 0 \\ a_i(f) - n_i(f) & \text{if } [a_i(f) - n_i(f)] \geq 0 \end{cases} \tag{4}$$

When noise estimations are available for every microphone, the processing steps are similar to that for estimating noises and signals of all ICA outputs and beam-forming outputs. In one embodiment, the ADMS of the present invention may learn from user selections over time. User operations provide the system precious data about users' preferences. The data may be used by ADO to improve itself gradually. The ADMS may employ a learning system run in parallel with the automatic control unit, so it can learn audio pickup strategies from human user operations. In one embodiment, $a_1, a_2, \ldots, a_R$ represent measurements from environmental sensors, and (x,y) on the captured main image correspond to a position of interest. In one embodiment, the main image may be a panoramic image. Then, the destination position (X,Y) for the audio pickup can be estimated with:

$$\begin{aligned}(X, Y) &= \underset{(x,y)}{\arg\max}\{p[(x, y) \mid (a_1, a_2, \ldots, a_R)]\} \\ &= \underset{(x,y)}{\arg\max}\left\{\frac{p[(a_1, a_2, \ldots, a_R \mid (x, y)] \cdot p(x, y)}{p(a_1, a_2, \ldots, a_R)}\right\} \\ &= \underset{(x,y)}{\arg\max}\{p[(a_1, a_2, \ldots, a_R \mid (x, y)] \cdot p(x, y)\}\end{aligned} \tag{5}$$

Assuming $a_1, a_2, \ldots, a_R$ are conditionally independent, the camera position can be estimated with:

$$\begin{aligned}(X, Y) &= \underset{(x,y)}{\arg\max}\{p[(x, y) \mid (a_1, a_2, \ldots, a_R)]\} \\ &= \underset{(x,y)}{\arg\max}\{p[a_1 \mid (x, y)] \cdot p[a_2 \mid (x, y)] \ldots p[a_R \mid (x, y)] \cdot p(x, y)\}\end{aligned} \tag{6}$$

Figure 9:
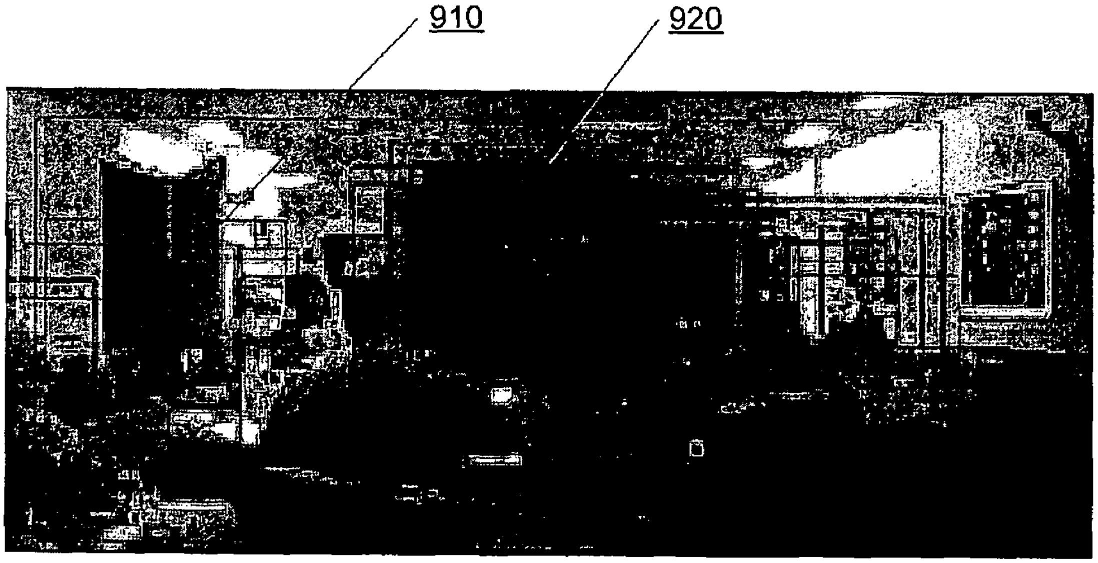
FIG. 9 is an illustration of user selection of audio requests over a period of time in accordance with one embodiment of the present invention.

The probabilities in eq. (6) can be estimated online. For example, FIG. 9 shows the users' selections during an extended period of a meeting for which the probability p(x,y) is being estimated. A typical image recorded during the meeting is used as the background to illustrate the spatial arrangement of a meeting room. In this figure, users' selections are marked with boxes. Many boxes in the image form a cloud of users' selections in the central portion of the image, where the presenter and a wall-sized presentation display are located. Based on this selection cloud, it is straightforward to estimate p(x,y).

Using progressive learning enables the system of the present invention to better adapt to environmental changes. In some cases, some sensors may become less reliable. For example, desks being moved may block the sound path of a microphone array. To adapt to these changes, a mechanism can learn how informative each sensor is. Assume (U,V) is the position of interest estimated by a sensor (a camera, microphone array, or other audio capture device) and (X,Y) is the camera position decided by users. How informative the sensor is can be evaluated through online estimation as follows:

$$I[(U,V),(X,Y)] = \int_{(U,V),(X,Y)} p[(U,V),(X,Y)]\cdot\log\frac{p[(U,V),(X,Y)]}{p(U,V)\cdot p(X,Y)} \quad (7)$$

Evaluation of eq. (7) gives mutual information between (U,V) and (X,Y). The higher the value, the more important the sensor is to the automatic control. When a sensor is broken, disabled, or yields poor information for any reason, the mutual information between the sensor and the human selection will decrease to a very small value, and the sensor will be ignored by the control software. This is helpful in allocating computational power to useful sensors. With similar techniques, the system can disable the rule-based automatic control system when the learning system can operate the camera better.

The signal quality of the captured audio signal can be processed and measured in numerous ways. In one embodiment, the signal quality of the audio signal may be improved by attempting to reduce the distortion of the audio signal captured.

Figure 10:
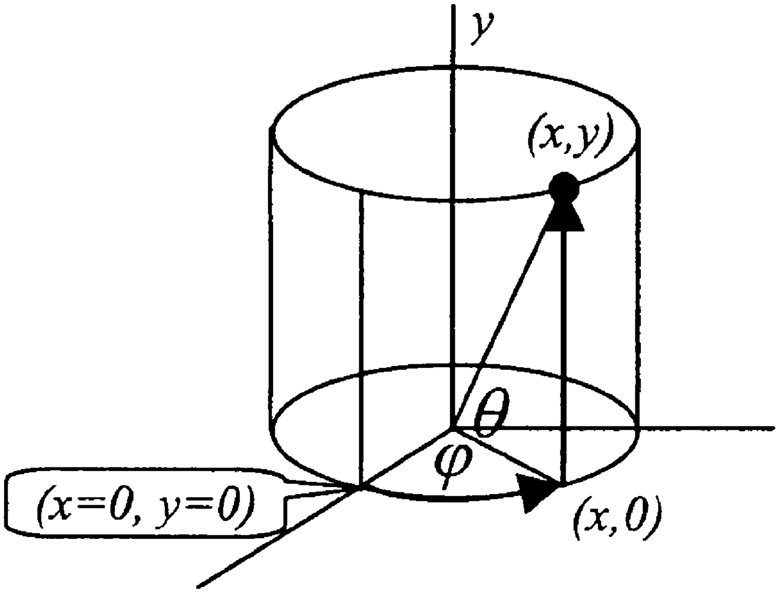
FIG. 10 is an illustration of a cylindrical coordinate system in accordance with one embodiment of the present invention.

Conceptually, the ideal signal received at a given point may be represented with f(ϕ,θ,t), where ϕ and θ are spatial angles used to identify the direction of a coming signal and t is the time. For derivations in later applications, a cylindrical coordinate system 1000 illustrated in FIG. 10 may be used to describe the signal. In FIG. 10, a line passing through the origin and a point on a cylindrical surface is used to define the signal direction. The point on the cylindrical surface has coordinates (x,y), where x is the arc length between (x=0, y=0) and the point's projection on y=0, and y is the height of the point from the plane y=0. With this coordinate system, the ideal signal is represented with $f(x,y,t)$. In one embodiment, a signal acquisition system may capture an approximation $\hat{f}(x,y,t)$ of the ideal signal $f(x,y,t)$ due to the limitation of sensors. The sensor control strategy in one embodiment is to maximize the quality of the acquired signal $\hat{f}(x,y,t)$.

The information loss of representing $f$ with $\hat{f}$ may be defined with $$D[\hat{f},f] = \sum_i p(R_i,t\mid O)\iiint_{R_i,T}\left|\hat{f}(x,y,t)-f(x,y,t)\right|^2 dx\,dy\,dt, \quad (8)$$

where $\{R_i\}$ is a set of non-overlapping small regions, T is a short time period, and $p(R_i,t|O)$ is the probability of requesting details in the direction of region-$R_1$ details (conditioned on environmental observation O).

This probability may be obtained directly based on users' requests. Suppose there are $n_i(t)$ requests to view region $R_i$ during the time period from t to t+T when the observation O is presented, and p and O do not change much during this period, then $p(R_i,t|O)$ may be estimated as $$p(R_i,t\mid O) = \frac{n_i(t)}{\sum_i n_i(t)}. \quad (9)$$

$$\iiint_{R_i,T}\left|\hat{f}(x,y,t)-f(x,y,t)\right|^2 dx\,dy\,dt$$

is easier to estimate in the frequency domain. If $\omega_x$ and $\omega_y$ represent spatial frequencies corresponding to x and y respectively, and $\omega_t$ is the temporal frequency, the distortion may be estimated with $$\iiint_{R_i,T}\left|\hat{f}(x,y,t)-f(x,y,t)\right|^2 dx\,dy\,dt = \iiint_{R_i,T}\left|\hat{F}(\omega_s,\omega_y,\omega_t)-F(\omega_x,\omega_y,\omega_t)\right|^2 d\omega_x\,d\omega_y\,d\omega_t. \quad (10)$$

The accomplishment of acquiring a high quality signal is equivalent to reducing $D[\hat{f},f]$. Assume $\hat{f}(x,y,t)$ is a band limited representation of $f(x,y,t)$. Reducing $D[\hat{f},f]$ may be achieved by moving steerable sensors to adjust cutoff frequencies of $\hat{f}(x,y,t)$ in various regions $\{R_i\}$. Assume the region i of $\hat{f}(x,y,t)$ has spatial cutoff frequencies $a_{x,i}(t)$, $a_{y,i}(t)$, and temporal cutoff frequency $a_{t,i}(t)$. The estimation of $$\iiint_{R_i,T}\left|\hat{f}(x,y,t)-f(x,y,t)\right|^2 dx\,dy\,dt$$

may then be simplified to $$\iiint_{R_i,T}\left|\hat{f}(x,y,t)-f(x,y,t)\right|^2 dx\,dy\,dt = \iiint_{\substack{R_i,T\\ \omega_x>a_{x,i}(t)\\ \omega_y>a_{y,i}(t)\\ \omega_t>a_{t,i}(t)}}\left|F(\omega_x,\omega_y,\omega_t)\right|^2 d\omega_x\,d\omega_y\,d\omega_t. \quad (11)$$

In this embodiment, the optimal sensor control strategy is to move high-resolution (i.e. in space and time) sensors to certain locations at certain time periods so that the overall distortion $D[\hat{f},f]$ is minimized.

Equations (8)-(11) described a way to compute the distortion when participants' requests were available. When participants' requests are not available, the estimation of $p(R_i,t|O)$ may become a problem. This may be overcome by using the system's past experience of users' requests. Specifically, assuming that the probability of selecting a region does not depend on time t, the probability may be estimated as:

$$p(R_i,t\mid O) = p(R_i\mid O) = \frac{p(O\mid R_i)\cdot p(R_i)}{p(O)}. \quad (12)$$

O can be considered an observation space of $\hat{f}$. By using a low dimensional observation space, it is easier to estimate $p(R_i,t|O)$ with limited data. With this probability estimation, the system may automate the signal acquisition process when remote users don't, won't, or cannot control the system.

Figure 11:
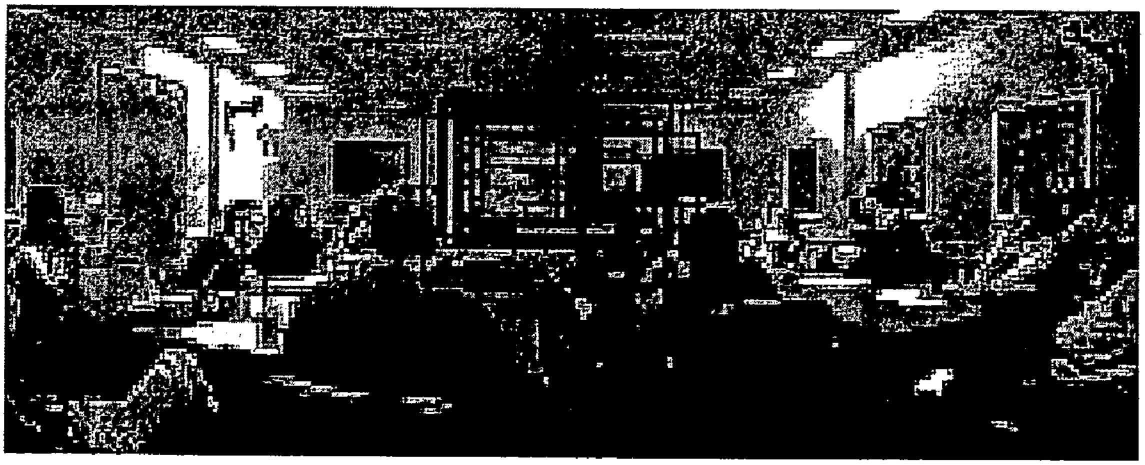
FIG. 11 is an illustration of a video frame with highlighted user selections in accordance with one embodiment of the present invention.
Figure 12:
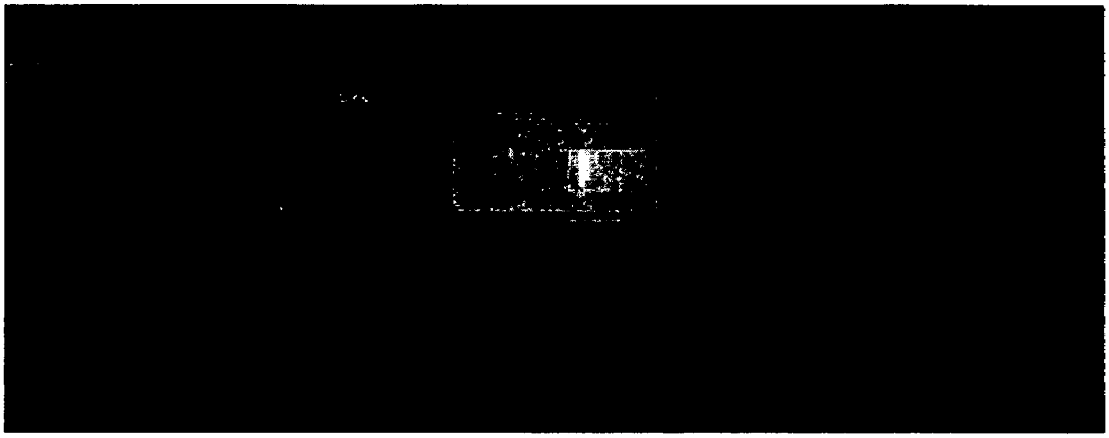
FIG. 12 is an illustration of a probability estimation of user selections in accordance with one embodiment of the present invention.

The equations (8)-(12) can be directly used for active sensor management. For better understanding of the present invention according to one embodiment, a conference room camera control example can be used to demonstrate the sensor management method of this embodiment of the present invention. A panoramic camera was used to record 10 presentations in our corporate conference room and 14 users were asked to select interesting regions on a few uniformly distributed video frames, using the interface shown in FIG. 4. FIG. 11 shows a typical video frame and corresponding selections highlighted with boxes. FIG. 12 shows the probability estimation based on these selections. In FIG. 12, lighter color corresponds to higher probability value and darker color corresponds to lower value.

To compute the distortion defined with eq. (8), the system needs the result from eq. (11). Since it is impossible to get complete information of $F(\omega_x, \omega_y, \omega_t)$, the system needs proper mathematical models to estimate the result. According to Dong and Atick, "Statistics of Natural Time Varying Images", Network:Computation in Neural Systems, vol. 6(3), pp.345-358, 1995, if a system captures object movements from distance zero to infinity, $F(\omega_x, \omega_y, \omega_t)$ statistically falls with temporal frequency, $\omega_t$, and rotational spatial frequency, $\omega_{xy}$, according to $$|F(\omega_{xy}, \omega_t)|^2 = \frac{A}{\omega_{xy}^{1.3} \cdot \omega_t^2}, \tag{13}$$

where A is a positive value related to the image energy.

In one embodiment, $b_{xy}$ and $b_t$ can be denoted as the spatial and temporal cutoff frequencies of the panoramic camera and $a_{xy}$ and $a_t$ as the spatial and temporal cutoff frequencies of a PTZ camera. Let $$E_{xy1} = \int_1^{b_t} \int_1^{b_{xy}} |F(\omega_{xy}, \omega_t)|^2 \, d\omega_{xy} \, d\omega_t . \tag{14}$$

$$E_{xy} = \int_1^{b_{xy}} |F(\omega_{xy}, 0)|^2 \, d\omega_{xy}$$

$$E_1 = \int_1^{b_t} |F(0, \omega_t)|^2 \, d\omega_t$$

If the system uses the PTZ camera instead of the panoramic camera to capture region $R_i$, the video distortion reduction achieved by this may be estimated with $$D_{G,i} = \left[ \frac{(a_{xy}^{0.3} - 1) \cdot (a_t - 1) \cdot b_{xy}^{0.3} \cdot b_t}{a_{xy}^{0.3} \cdot a_t \cdot (b_{xy}^{0.3} - 1)(b_t - 1)} - 1 \right] \cdot E_{xyt,i} + \left[ \frac{(a_{xy}^{1.3} - 1) \cdot b_{xy}^{1.3}}{a_{xy}^{1.3} \cdot (b_{xy}^{1.3} - 1)} - 1 \right] \cdot E_{xy,i} + \left[ \frac{(a_t - 1) \cdot b_t}{a_t \cdot (b_t - 1)} - 1 \right] \cdot E_{t,i}. \tag{15}$$

Coordinates (X,Y,Z), corresponding to sensor features pan/tilt/zoom, can be associated with as the best pose of the camera or sensor. With eq. (8) and eq. (15), (X,Y,Z) can be estimated with $$(X, Y, Z) = \underset{(x,y,z)}{\arg\max} [p(R_i, t \mid O) \cdot D_{G,i}]. \tag{16}$$

Figure 13:
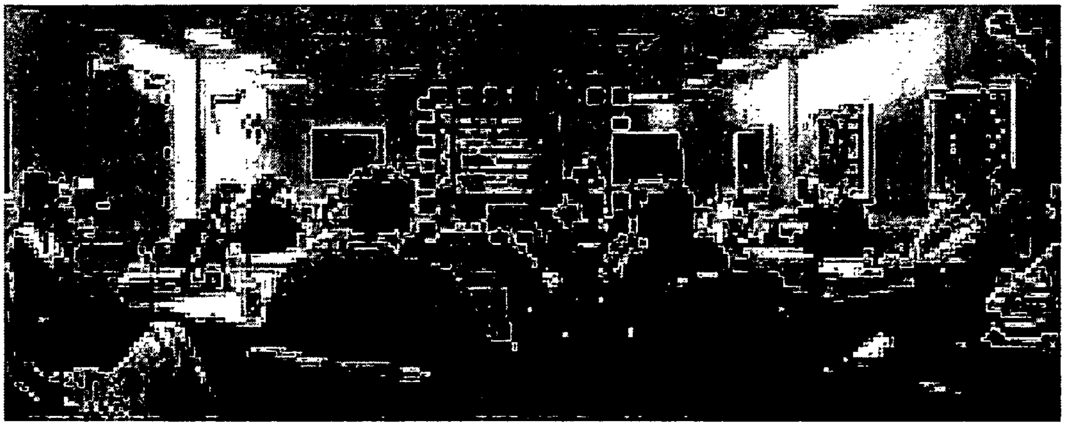
FIG. 13 is an illustration of a video frame with a highlighted system selection in accordance with one embodiment of the present invention.

In the experiment discussed above, the panoramic camera has 1200×480 resolution, and the PTZ camera has 640×480 resolution. Compared with the panoramic camera, the PTZ camera can achieve up to 10 times higher spatial sampling rate by performing optical zoom in practice. The camera frame rate varies over time depending on the number of users and the network traffic. The frame rate of the panoramic camera was assumed to be 1 frame/sec and the frame rate of the PTZ camera is assumed to be 5 frames/sec. With the above optimization procedure and users' suggestions shown in FIG. 11, the system selects the rectangular box in FIG. 13 as the view of the PTZ camera.

Figure 14:
FIG. 14 is an illustration of video frame with an alternative highlighted system selection in accordance with one embodiment of the present invention.

When users' selections are not available to the system, the system has to estimate the probability term (i.e. predicts users' selections) according to eq. (13). Due to the imperfection of the probability estimation, the distortion estimation without users' inputs is a little bit different from the distortion estimation with users' inputs. This estimation difference leads the system to a different PTZ camera view suggestion shown in FIG. 14. By visually inspecting automatic selections over a long video sequence, these automatic PTZ view selections are very close to those PTZ view selections estimated with users' suggestions. If we replace the panoramic camera and the PTZ camera in this experiment with a low spatial resolution microphone array and a steer-able unidirectional microphone, the proposed control strategy can be used to control the steer-able microphone as we use it to control the PTZ camera.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, remotely managing audio devices.

The invention claimed is:

1. A method for managing audio devices located at a live event during the live event, comprising:

capturing video content of a first view of the live event at a first location, wherein different areas of the live event are associated with a plurality of audio devices located at the first location, the plurality of audio devices capturing audio originating from the different areas in the live event;

providing the video content of the first view of the live event captured at the first location to a user at a second location during the live event, wherein the video content is displayed to the user in a graphical user interface (GUI) that enables the user to select regions of the first view, and wherein each region of the first view shows one of the different areas of the live event;

receiving through the GUI a selection of a first region of the first view, the selection made by the user during the live event, and within the first view shown in the GUI;

determining a first area of the live event associated with the first region;

determining which audio devices at the first location are associated with the first area of the live event;

selecting a first audio device at the first location associated with the first area of the live event from the plurality of audio devices; and providing live audio from the selected first audio device to the user at the second location along with the video content of the first view of the live event.

2. The method of claim 1 wherein selecting the audio device includes:

selecting a plurality of audio devices at the first location associated with the first region;

comparing parameters for each audio device; and selecting one of the plurality of audio devices.

3. The method of claim 2 wherein the parameters include signal to noise ratio.

4. The method of claim 1 wherein selecting the audio device includes:

determining that no audio device is associated with the first region; and determining an alternative audio device to operate as the audio device associated with the first region, the alternative audio device configured to capture audio associated with the first region.

5. The method of claim 1 wherein providing audio includes:

providing 2-way audio between the user and a second user, the user located at a remote location and the second user located at the first location associated with the video content.

6. The method of claim 1, further comprising:

automatically selecting a second region of the video content, the second region of the video content including at least one second area of the video content associated with a second weight and selected as a result of detecting motion in the video content, the first region of the video content including at least one area of the video content associated with a first weight; and providing audio from the audio device associated with the region of the video content associated with the highest weight.

7. The method of claim 1 wherein selecting the audio device includes:

automatically selecting one of the plurality of audio devices based on the first region.

8. The method of claim 7 wherein the automatically selecting one of the plurality of audio devices includes:

selecting audio devices, wherein each of the audio devices are configured to capture audio associated with the location corresponding to the first region;

determining the signal to noise ration for each of the audio devices; and selecting the audio device having the highest signal to noise ratio.

9. The method of claim 1 wherein the audio device includes a far-field microphone and a close-talking microphone.

10. A non-transitory computer readable medium having a program code embodied therein, said program code adapted to manage audio devices located at a live event during the live event, comprising the steps of: computer code for capturing video content of a first view of the live event at a first location, wherein different areas of the live event are associated with a plurality of audio devices located at the first location, the plurality of audio devices capturing audio originating from the different areas in the live event; computer code for providing the video content of the first view of the live event captured at the first location to a user at a second location during the live event wherein the video content is displayed to the user in a graphical user interface (GUI) that enables the user to select regions of the first view, and wherein each region of the first view shows one of the different areas of the live event; computer code for receiving through the GUI a selection of a first region of the first view, the selection made by the user during the live event, and within the first view shown in the GUI; computer code for determining a first area of the live event associated with the first region; computer code for determining which audio devices at the first location are associated with the first area of the live event; computer code for selecting a first audio device at the first location associated with the first area of the live event from the plurality of audio devices; and computer code for providing live audio from the selected first audio device to the user at the second location along with the video content of the first view of the live event.

11. The non-transitory computer readable medium of claim 10 wherein computer code for selection of an audio device includes: computer code for selecting a plurality of audio devices at the first location associated with the first region; computer code for comparing signal-to-noise ratios for each audio device; and computer code for selecting one of the plurality of audio devices.

12. The non-transitory computer readable medium of claim 10 wherein computer code for selection of an audio device includes: computer code for determining that no audio device is associated with the first region; and computer code for determining an alternative audio device to operate as the audio device associated with the first region, the alternative audio device configured to capture audio associated with the first region.

13. The non-transitory computer readable medium of claim 10, further comprising: computer code for automatically selecting a second region of the video content, the second region of the video content including at least one second area of the video content associated with a second weight and selected as a result of detecting motion in the video content, the first region of the video content including at least one second area of the video content associated with a first weight; and providing audio from the audio device associated with the region of the video content associated with the highest weight.

14. The non-transitory computer readable medium of claim 10, further comprising: providing 2-way audio between the user and a second user, the user located at a remote location and the second user located at the first location association with the video content.

15. A method for managing audio devices located at a live event during the live event comprising:

capturing video content of a first view of the live event at a first location, wherein different areas of the live event are associated with a plurality of audio devices located at the first location, the plurality of audio devices capturing audio originating from the different areas in the live event;

providing the video content of the first view of the live event captured at the first location to a user at a second location during the live event wherein the video content is displayed to the user in a graphical user interface (GUI) that enables the user to select regions of the first view, and wherein each region of the first view shows one of the different areas of the live event;

receiving through the GUI a selection of a first region of the first view, the selection made by the user during the live event, and within the first view shown in the GUI;

determining a first area of the live event associated with the first region;

determining which audio devices at the first location are associated with the first area of the live event;

selecting a first audio device at the first location associated with the at least one area within the first area of the live event from the plurality of audio devices; and providing two-way communication between the user at the second location and the first audio device at the first location along with the video content of the first view of the live event.

* * * * *